US00RE35410E

United States Patent [19]

Adcock et al.

[11] E Patent Number: Re. 35,410

[45] Reissued Date of Patent: Dec. 31, 1996

[54] SPA WITH RECESSED FILTER CHAMBER

[75] Inventors: Carson D. Adcock, Huntingdon Valley, Pa.; Robert Lauter, Fort Wayne, Ind.

[73] Assignee: W. W. Adcock, Inc., Huntingdon Valley, Pa.

[21] Appl. No.: 77,346

[22] Filed: Jun. 14, 1993

Related U.S. Patent Documents

Reissue of:

[64] Patent No.: 4,552,658
Issued: Nov. 12, 1985
Appl. No.: 645,870
Filed: Aug. 31, 1994

[51] Int. Cl.[6] ..... A61H 33/00

[52] U.S. Cl. ..... 4/541.3; 4/488; 4/490; 210/169; 210/416.2

[58] Field of Search ..... 4/506, 507, 508, 4/490, 541.1, 541.3, 584; 210/169, 416.2, 232, 238, 194, 445, 451

[56] References Cited

U.S. PATENT DOCUMENTS

| | | | |
|---|---|---|---|
| 1,748,129 | 2/1930 | Hughes | 285/19 |
| 2,673,100 | 3/1954 | Shumaker | 285/31 |
| 2,757,800 | 8/1956 | Kucera | 210/316 |
| 2,783,893 | 3/1957 | Romanoff | 210/169 |
| 2,822,201 | 2/1958 | Wood | 210/238 |
| 3,227,475 | 1/1966 | Sinkinson | 285/9.2 |
| 3,240,342 | 3/1966 | Callahan, Jr. et al. | 210/232 |
| 3,240,346 | 3/1966 | Callahan, Jr. et al. | 210/448 |
| 3,327,858 | 6/1967 | Eddy et al. | 210/448 |
| 3,447,687 | 6/1969 | Canterbury | 210/232 |
| 4,142,337 | 3/1979 | Holcomb | 4/541.1 |
| 4,233,694 | 11/1980 | Janosko et al. | 4/541.3 |
| 4,416,775 | 11/1983 | Halbich et al. | 210/282 |
| 4,419,775 | 12/1983 | Ebert | 4/542 |
| 4,426,286 | 1/1984 | Puckett et al. | 210/169 |
| 4,443,900 | 4/1984 | Remeyer | 4/488 |
| 4,533,476 | 8/1985 | Watkins | 210/169 |
| 5,236,581 | 8/1993 | Perry | 210/169 |

*Primary Examiner*—Robert J. Popovics
*Attorney, Agent, or Firm*—Synnestvedt & Lechner

[57] ABSTRACT

A spa or bath is disclosed having a molded shell with a filter cavity molded therein, the cavity being proportioned and arranged to receive a filter, and the cavity further being open inwardly and upwardly of the shell, thereby simplifying removal and insertion of the filter.

4 Claims, 2 Drawing Sheets

SPA WITH RECESSED FILTER CHAMBER

Matter enclosed in heavy brackets [ ] appears in the original patent but forms no part of this reissue specification; matter printed in italics indicates the additions made by reissue.

BACKGROUND AND STATEMENT 0F OBJECTS

This invention relates to a bath, pool or spa having a water circulation system in which a filter is provided in order to remove foreign matter from the water. Although the invention may be employed in bath or pool arrangements of a wide variety of types, the invention is especially adapted for use in what is commonly referred to as a spa, i.e., a bath having a shell of size adapted to accommodate several occupants and having a water circulation system, usually including jets for intensifying the water circulation in various regions, this type of circulation commonly being employed for muscular relaxation or therapeutic purposes.

A bath or pool of this type is commonly referred to as a spa, and as the invention is particularly adapted for use in such a device, it is described hereinafter as embodied in a spa adapted for multiple occupancy and preferably also adapted alternatively for use either outdoors or within a house or enclosure.

Spas of this type ordinarily comprise a molded shell, which may be variously configured to provide seating or reclining supports, usually for a plurality of individuals. It is well-known in such spas to provide a water circulation system including suction openings in the shell from which the water is withdrawn, and return passages, usually including jet nozzles for stimulating water circulation within the shell. The water circulation system commonly also includes a circulating pump, and in addition, a heater system by which the circulating water may be warmed or heated. Still further, provision is commonly made in the water circulation system for the use of a filter, and the various components including the pump, the heater and the filter have heretofore customarily been arranged exteriorly of the shell, quite commonly within a wood enclosure providing a space surrounding the outside of the shell.

In contrast with the conventional filter arrangement above-described, the present invention provides a novel filter arrangement in a system of the kind above referred to. According to the invention, the shell itself is provided with a filter chamber or cavity which is open to the interior of the shell and which is configured to receive a filter in a location and in a manner readily accessible without the necessity for opening the outside enclosure.

According to the invention, the filter cavity is provided in its lower region with a cradle for receiving the filter, the cradle having a suction connection through which the filtered water may be withdrawn, and the filter and cradle being arranged to provide for ready removal and replacement of the filter itself without disconnection of any circulation piping or enclosure joints.

The invention also contemplates employment of a surface skimming weir arranged to provide for entry of the water into the filter cavity from the surface layer of the water in the shell of the spa.

BRIEF DESCRIPTION OF THE DRAWINGS

How the foregoing and other objects and advantages are attained will appear more fully from the following description of the accompanying drawings, in which.

DETAILED DESCRIPTION Of THE DRAWINGS

Figure 2:
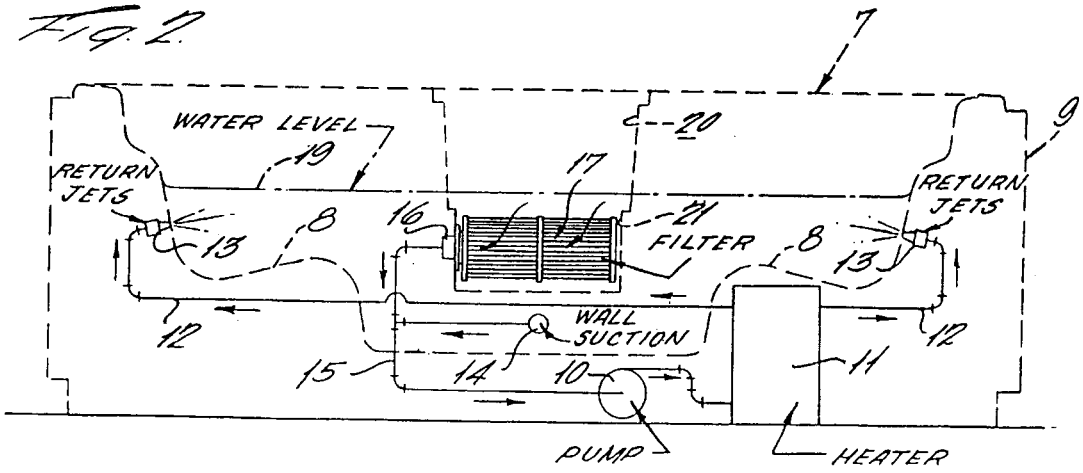
FIG. 2 is a somewhat diagrammatic elevational view of portions of the shell of the spa and of the filter cavity, and further indicating in the manner of a block diagram the various components and connections of the water circulation system.

The spa illustrated in the accompanying drawings comprises a shell generally indicated at 7 for receiving the spa water. The shell has upright walls and is also provided with interior seats or benches, such as indicated at 8. Surrounding the outside of the shell, an enclosure 9 is provided, such enclosures have been known in various forms of spas and commonly being made of wood and providing an enclosed space for receiving components of the water circulation system, certain of the major components of which are indicated diagrammatically in FIG. 2. In a typical embodiment, the water circulation system includes a pump 10 with its delivery connection associated with a water heater 11 from which return connections, such as shown at 12, are provided, these connections serving to return the water to the interior of the shell, for example, through return jets 13.

A suction inlet, such as indicated at 14, is associated with the suction connection 15 leading to the suction side of the pump 10. The suction inlet 14 is located in the wall of the shell near the bottom of the shell, and in addition, another suction inlet, diagrammatically indicated at 16, is provided in a location described more fully hereinafter, the inlet 16 being associated with the filter shown at 17.

Figure 1:
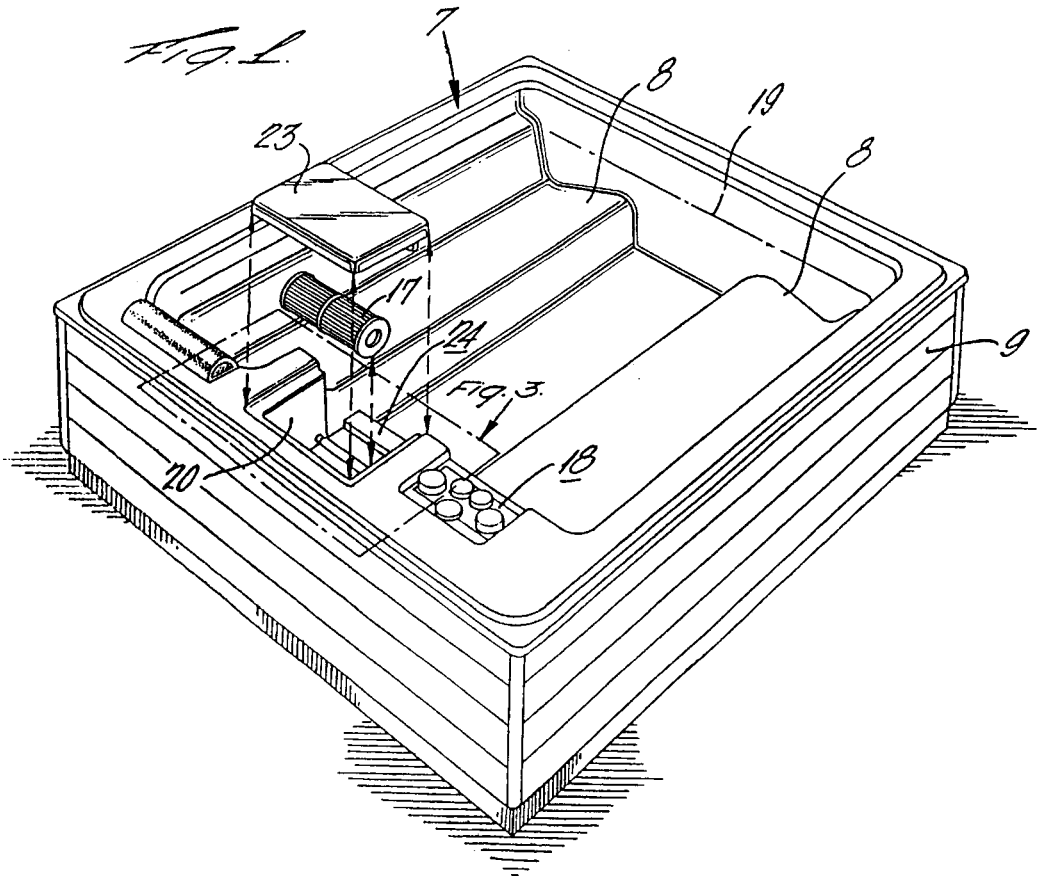
FIG. 1 is a perspective view of a spa constructed according to the present invention and showing the location of the filter cavity and of the filter.

The circulation system may include various other devices and connections, including a water supply, and the overall system is adapted to be controlled in known manner as by means of various control devices indicated diagrammatically in FIG. 1 on the control panel 18, this panel being located above the level of the water in the shell for ready access either from the interior of the spa or from the outside thereof. In typical operation, the water level may be established, for instance, as indicated by the water level line 19 in FIG. 2.

Attention is now directed to the configuration of the wall of the shell so as to provide the cavity above referred to for receiving the filter 17. This cavity has an upper portion 20 which is upwardly open and also inwardly open to the interior of the shell. Below the portion 20 is another portion 21 which is upwardly open to the portion 20 and which is adapted to receive the filter 17. From FIG. 5 it will be seen that the lower portion of the cavity 21 is separated from the interior of the shell by the partition or wall structure which is integrally molded with other portions of the shell and forms the filter cavity which is shaped and adapted to receive the filter in horizontal position, as is illustrated in the drawings.

Figure 3:
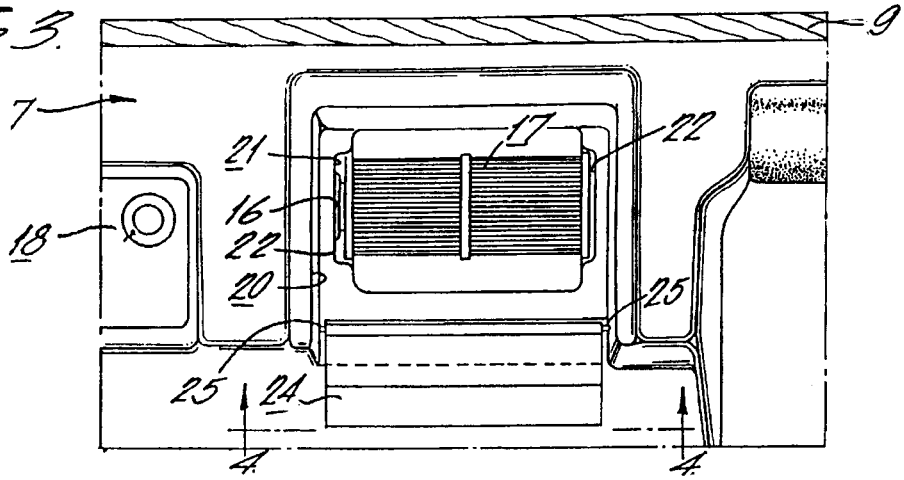
FIG. 3 is a fragmentary plan view taken as indicated by the dot-dash line 3 on FIG. 1 and showing the plan configuration of the filter cavity with the filter therein.
Figure 5:
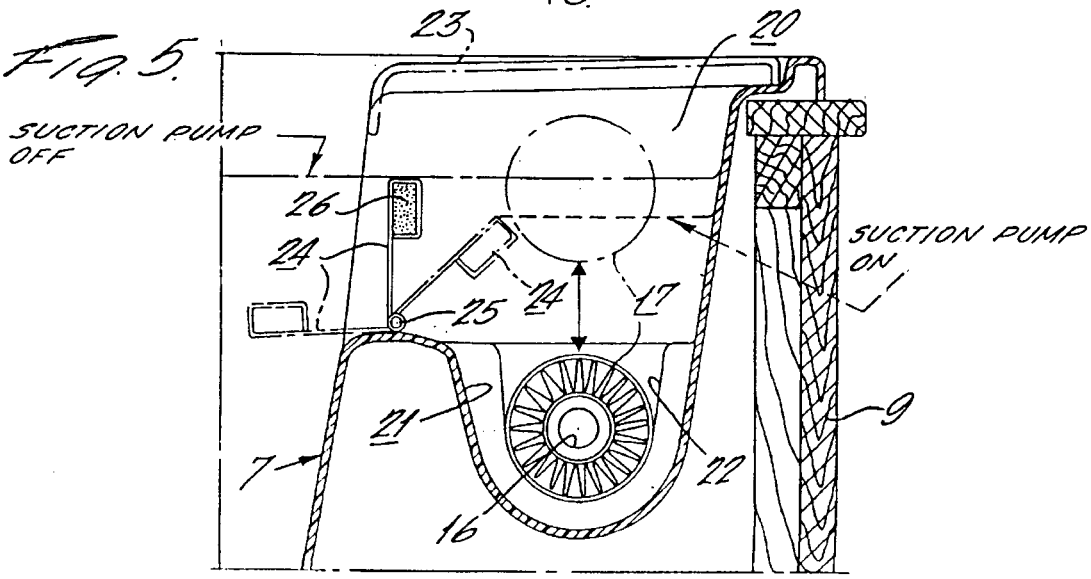
FIG. 5 is a transverse sectional view taken as indicated by the section line 5—5 on FIG. 4.

As seen in FIGS. 3 and 5, the lower portion of the filter cavity has an upwardly open cradle support 22 at each end for receiving the ends of the filter, which is of generally cylindrical form, this being a form of filter widely used in this art. The interior hollow of the cylindrical filter communicates at one end with the suction inlet 16, and the flow through the filter is radially inwardly through the porous strips or fins of which such filters are commonly composed.

Figure 4:
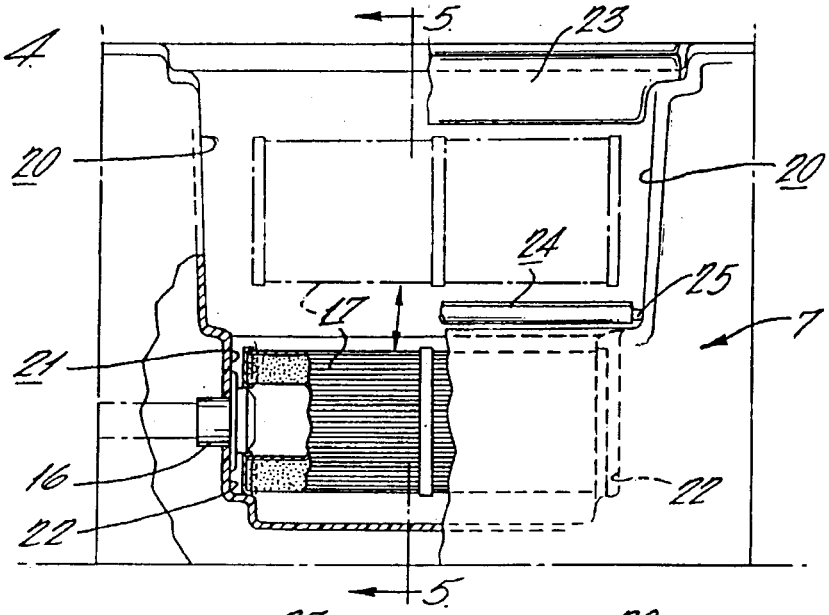
FIG. 4 is a fragmentary elevational view taken as indicated by the line 4—4 on FIG. 3 and illustrating certain portions of the filter and cavity in elevation and certain portions in vertical section.

As seen in FIGS. 1, 4 and 5, a separate removable cover for the filter cavity is provided, this cover being generally indicated at 23. The cover may be lifted vertically away from the filter cavity in the manner indicated in FIG. 1, and removal of the cover provides ready access to the interior of the filter cavity and permits the convenient removal of the filter 17 in the manner which is also somewhat diagrammatically indicated in FIG. 1. This upward displacement of the filter is further shown in FIGS. 4 and 5.

When the filter is in its normal position in the cradle at the bottom of the filter cavity, the filter cavity may receive water from the surface region in the spa, and for this purpose, a surface skimming weir is provided. A weir of this type is also illustrated in the drawings, and particular attention is directed to FIG. 5. Here, it will be seen that the weir 24 is pivotally mounted on a horizontal axis at 25 at the entranceway from the interior of the shell into the filter cavity. The weir 24 includes a mounting plate extending substantially completely across the entranceway into the filter cavity. The upper edge portion of the weir is preferably employed as an enclosure for a porous or other similar material 26 having buoyancy which will support the weir 24 in a position on the surface of the water, depending upon the level established by the supply and pumping system. With the weir pivoted at the upper edge of the partition or wall structure between the lower portion of the filter cavity and the interior of the shell, the mounting plate for the weir serves as a blocking means and block most of the flow into the filter cavity throughout the region below the water level established by the weir.

In referring to FIG. 5, it will be seen that with the suction pump turned off, the water level is desirably established so that the pivotally mounted weir 24 will assume a substantially vertical position. Therefore, during suction, the flow of the water, when the skimming action occurs from the central region of the spa shell into the filter cavity, will result in some downward deflection in the position of the skimming weir, as also appears in FIG. 5, at which time the level of the water is lowered as compared with the condition where the suction pump has been turned off. Because of this action, the filter 17, in effect, is a skim filter providing for skimming of the surface water in the shell, with consequent skimming of debris or other materials which normally accumulate on the surface of the water.

As seen in FIGS. 1, 3 and 5, it will also be understood that when the filter is being upwardly displaced for removal and replacement, the skimming weir may readily be swung inwardly and held in the position shown toward the left in FIG. 5, thereby providing adequate clearance for upward displacement and removal of the filter. It will be understood that when released, the weir will tend to seek the level of the water in the shell of the spa.

With further reference to the filter cavity, it is pointed out that it is widely known in the fabrication of spa shells to employ sheet plastic or resin material which is laid into a female mold of the desired shell configuration. Appropriate suction perforations are provided in the mold structure in order to draw the sheet material downwardly into the mold and thus shape the shell to the desired overall contour. In a typical case, such shell molding is accomplished with the use of a sheet formed of acrylonitrile-butadiene styrene plastic material. This material may be softened by appropriate heating. The sheet material employed may also, if desired, be made up of coextruded or laminated layers, as is well understood in this art, and resins and molding techniques of various known types may be employed in the fabrication of the spa shell having the filler cavity conforming with the present invention.

In accordance with the present invention, the mold employed in the fabrication of the shell has portions adapted to provide the desired filter cavity which is both upwardly and inwardly open, as clearly illustrated in the drawings and as already described above. The side walls defining the filter cavity are preferably upwardly flaring in order to facilitate vertical separation of the formed shell from the mold.

In this way, provision is made for providing a readily accessible filter cavity which is seamless and molded integrally with the shell. With the filter cradle located below the water level in the shell, the filter itself may readily be withdrawn and replaced without disconnection of any part of the circulation system.

While providing the convenience above referred to in connection with the maintenance and replacement of the filter, the invention also provides for such replacement without the necessity for disconnecting and reconnecting any joints in the circulation system and without the necessity for draining the shell or even lowering the normal water level in the shell.

We claim:

1. A spa with a water recirculation system, comprising a molded shell for [the] spa water having a filter cavity integrally molded with the shell below the [water] level *of the spa water* and upwardly open for access from above the water level, the cavity being inwardly open to the interior of the shell to receive water therefrom and having a filter chamber in the lower portion thereof positioned to receive a filter in a horizontal position at a level below the water level in the shell, *said filter chamber in the lower portion of said cavity being separated from the interior of the shell by a partition,* and the filter chamber having a suction connection extended exteriorly of the shell, and a renewable filter positioned horizontally in said chamber to receive water flowing into the filter chamber from the interior of the shell and delivering [the] filtered water to said suction connection.

2. A spa as defined in claim 1 and further including a displaceable covering lid for said filter cavity.

3. A spa comprising a shell for [the] spa water, a filter cavity integrally molded with the shell and inwardly open to the interior of the shell in the region of the [water] level *of the spa water* to receive surface water therefrom, and a replaceable generally cylindrical filter received in said cavity in a horizontal position, the cavity being manually accessible from a region above the water level and having upwardly open cradle supports for the end portions of the filter, the filter being removable by manual vertically upward displacement of the filter from the upwardly open cradle supports, and the wall of the cavity at one end of the filter having a suction connection for withdrawal of [the] filtered water.

4. A spa with a water circulation system, comprising a shell formed of molded plastic sheet material having portions defining bottom and side walls of a bath chamber for

[the] spa water, said plastic sheet material also having integrally molded portions joining one of the side walls of the bath chamber and defining a filter cavity configured to receive a generally cylindrical filter positioned on a horizontal axis, the filter cavity communicating with the bath chamber below the level of the spa water, *and said cavity having a filter chamber in the lower portion thereof, said filter chamber being separated from the interior of the shell by a partition,* portions of said plastic sheet material defining the filter cavity being positioned to define a cavity having upwardly flaring side walls one of which joins and is integrally molded with the adjacent side wall of the bath chamber at a level above the bottom of the bath chamber but below the water level in the bath chamber, a replaceable generally cylindrical filter positioned on a generally horizontal axis in the filter cavity, the filter cavity having an upwardly presented access opening to provide for manual sidewise insertion and removal of the filter, and a suction connection at one end of the filter cavity for withdrawal and recirculation of [the] filtered water.

* * * * *

UNITED STATES PATENT AND TRADEMARK OFFICE

CERTIFICATE OF CORRECTION

PATENT NO. : Re. 35,410

DATED : December 31, 1996

INVENTOR(S) : Carson D. Adcock and Robert Lauter

It is certified that error appears in the above-identified patent and that said Letters Patent is hereby corrected as shown below:

Title page [64] Filed:, delete "Aug. 31, 1994" and insert --Aug. 31, 1984-- therefor.

Signed and Sealed this

Sixth Day of May, 1997

*Attest:*

*Attesting Officer*

BRUCE LEHMAN

*Commissioner of Patents and Trademarks*